United States Patent
Zulauf et al.

(10) Patent No.: US 7,147,013 B2
(45) Date of Patent: Dec. 12, 2006

(54) FLUID CONTAINMENT APPARATUS, AND METHOD OF USING SAME

(75) Inventors: Gary B. Zulauf, Findlay, OH (US); Michael S. Lynch, Fostoria, OH (US)

(73) Assignee: Honeywell International, Inc., Morristown, NJ (US)

( * ) Notice: Subject to any disclaimer, the term of this patent is extended or adjusted under 35 U.S.C. 154(b) by 470 days.

(21) Appl. No.: 10/672,467

(22) Filed: Sep. 26, 2003

(65) Prior Publication Data
US 2005/0067343 A1     Mar. 31, 2005

(51) Int. Cl.
*B65B 1/04*     (2006.01)
(52) U.S. Cl. ............... 141/86; 141/1; 141/97; 210/248
(58) Field of Classification Search ......... 141/1, 141/86, 97, 98; 210/238, 248, 541; 184/1.5; 220/694, 730, 737; 222/108
See application file for complete search history.

(56) References Cited

U.S. PATENT DOCUMENTS

| | | | |
|---|---|---|---|
| 4,376,703 A * | 3/1983 | Krauss | 210/238 |
| 4,451,368 A * | 5/1984 | Pandelena et al. | 210/238 |
| 4,501,305 A * | 2/1985 | Zola et al. | 141/86 |
| 5,271,299 A * | 12/1993 | Wadsworth | 81/121.1 |
| 5,366,084 A * | 11/1994 | Post | 206/319 |
| 5,421,223 A * | 6/1995 | Wawrzyniak | 81/121.1 |
| 6,325,247 B1 * | 12/2001 | Iggulden | 222/108 |

* cited by examiner

*Primary Examiner*—Timothy L. Maust

(57) ABSTRACT

A spillage-control boot apparatus for use during removal of a spin-on fluid filter from an engine block or other substrate. The boot apparatus includes a boot with a substantially cylindrical boot body, including a flared bell portion for placement surrounding a filter, and a constricted portion integrally attached to and extending from the flared bell portion, for placement closely surrounding a portion of the filter. The flared bell portion of the boot body is adapted to form an annular pocket therein when the boot is placed surrounding a cylindrical filter. The apparatus also includes an absorbent member, for placement in the flared bell portion of the boot body, for absorbing spillage from the filter base when the filter is removed from the substrate.

11 Claims, 9 Drawing Sheets

FLUID CONTAINMENT APPARATUS, AND METHOD OF USING SAME

BACKGROUND OF THE INVENTION

1. Field of the Invention

The present invention relates to a fluid containment apparatus for use with a spin-on filter cartridge, and to a method of using the described apparatus. More particularly, the present invention relates to a composite boot apparatus, including a flexible boot and an absorbent member associated therewith, and to a method of using the described boot apparatus to minimize spillage during removal of a spin-on filter cartridge.

2. Description of the Background Art

Cartridge-type fluid filters, of the spin-on variety, are well known and are widely used, for example as engine oil filters, and as fuel filters in gasoline filling stations. However, when it becomes necessary to change a filter of this type, some fluid normally spills out of the filter when it is removed from its mounting area, particularly if the filter is mounted horizontally. Such spillage is somewhat messy, unsightly and inconvenient.

A number of different devices are known for controlling and/or containing spillage from a spin-on cartridge filter during removal thereof. Examples of some of the known devices include U.S. Pat. No. 4,177,529 to Sikula, Jr., U.S. Pat. No. 5,271,299 to Wadsworth, U.S. Pat. No. 5,694,990 to Crima, U.S. Pat. No. 5,623,755 to Childress et al., and U.S. Pat. No. 6,056,874 to Goodman.

The devices shown in the Childress and Wadsworth references each include a bag or boot which substantially covers and surrounds the base of the filter cartridge, during removal thereof, to contain fluid which may spill from the filter is when it is removed. The apparatus of Wadsworth involves a flexible boot, which is used in conjunction with a filter wrench, to cover both the filter wrench and filter.

Although the known devices have some utility for their intended purposes, a need still exists in the art for an improved fluid containment method, and an apparatus for containing spillage from around the base of a spin-on cartridge filter during removal of the filter from a substrate. It would be advantageous to minimize spillage during removal of spin-on fluid filters, for reasons of safety, environmental protection, and general cleanliness.

In particular, there is a need for an improved fluid containment apparatus which includes both a sealing member and an absorbent material associated with the sealing member.

SUMMARY OF THE INVENTION

The present invention provides a fluid containment apparatus for minimizing spillage from a spin-on fluid filter during a filter change.

The apparatus hereof helps contain spillage from a spin-on fluid filter, such as a fuel filter or oil filter, during removal of the filter from an engine block or other substrate.

An apparatus according to a first embodiment of the present invention, generally, includes a flexible boot and an absorbent member associated with the boot. The absorbent member may be attached to the boot, or may be nestingly received inside the boot, to fit between the boot and a filter.

In a particular embodiment of the invention, a fluid containment apparatus includes a boot with a substantially cylindrical boot body, including a flared bell portion for placement surrounding a filter and spaced away therefrom, and a constricted portion for placement closely surrounding a portion of the filter. The constricted portion is integrally attached to, and coextensive with the flared bell portion. The flared bell portion of the boot body is adapted to form an annular pocket therein, between the boot and filter, when the boot is placed surrounding a cylindrical filter.

The boot may be formed of a vinyl polymer or an oil-tolerant elastomer. Other suitable materials include urethanes and plastisol.

The absorbent member is provided for placement at least partly disposed inside of the flared bell portion of the boot body. The absorbent member absorbs spillage emanating from the filter base, when the filter is removed from the substrate. The absorbent member may be a fibrous pad and may be generally cylindrical in shape, or alternatively, may be a flat section of material, which is manually bent into a cylindrical shape for placement in the flared bell portion of the boot body.

The absorbent member may be made from a nonwoven fabric material, may include a sponge, or may be an aggregate material, which may include one or more fibers taken from the group including cotton and synthetic fibers. In some embodiments, the boot may be formed from an absorbent material such as an open-cell plastic foam, in which case the apparatus may be formed as a single piece where the boot also serves as the absorbent member.

In another embodiment of the invention, the boot may be formed as a substantially cylindrical tube of flexibly resilient material, which has been effectively folded back on itself to form a wall having dual thickness. In this dual thickness embodiment, the boot body includes a tubular inner section having a substantially constant diameter, and an outer sleeve section connected to and substantially surrounding the inner section. The outer sleeve section includes a constricted portion, which closely surrounds the inner section, and a flared bell portion having a larger diameter than the constricted portion. In the dual thickness embodiment, a pocket is defined in the flared bell portion of the boot body, between the inner and outer sections thereof.

The present invention also relates to a method of minimizing fluid spillage during removal of a fluid filter from a substrate.

In a particular embodiment, a method according to the present invention includes a step of slidably placing a substantially cylindrical fluid containment apparatus around a cylindrical fluid filter, the fluid containment apparatus comprising an absorbent member. The boot is then slid over the filter towards an engine block or other substrate on which the filter is mounted, until part of the boot apparatus contacts the substrate. The boot, the absorbent member or both can contact the substrate.

After the boot apparatus contacts the substrate, the filter is rotated to begin unscrewing it from the substrate. Some fluid spills forth from the filter as spillage proximate the substrate when the filter is removed, and the absorbent member absorbs at least part of that spillage. The method also includes a step of removing the filter from the substrate. After removal, the filter is disposed of in approved fashion.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Overview

Figure 1:
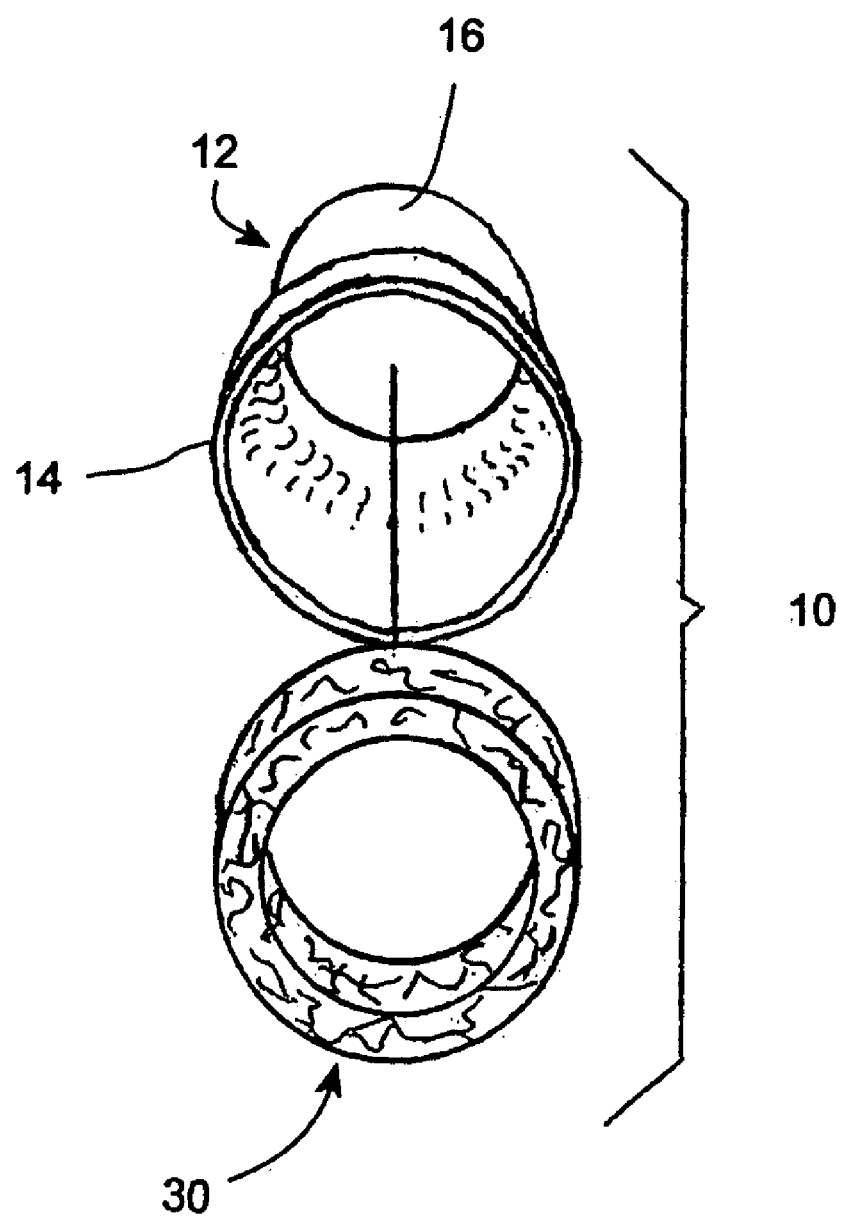
FIG. 1 is an exploded perspective view of a fluid containment apparatus according to a first embodiment of the invention.
Figure 2:
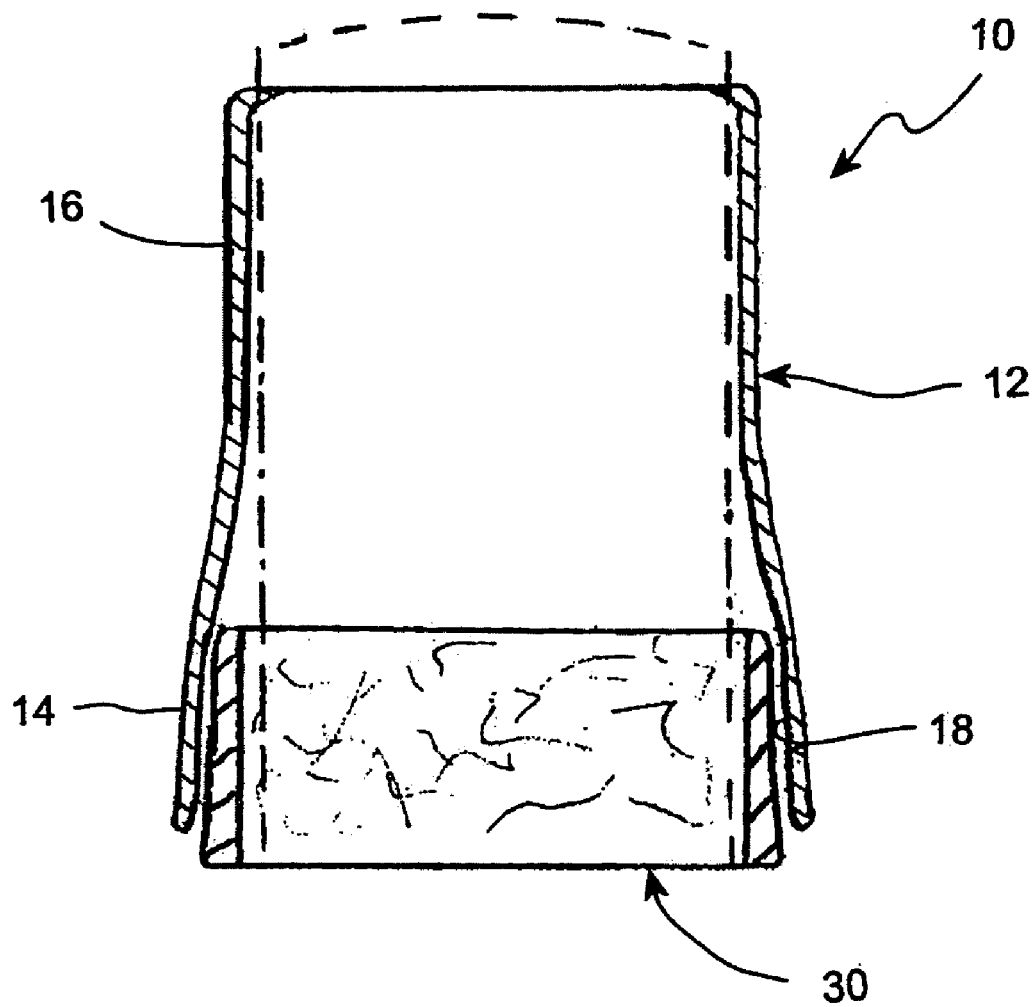
FIG. 2 is a cross-sectional view of the apparatus of FIG. 1, with a fluid filter shown in phantom.
Figure 3:
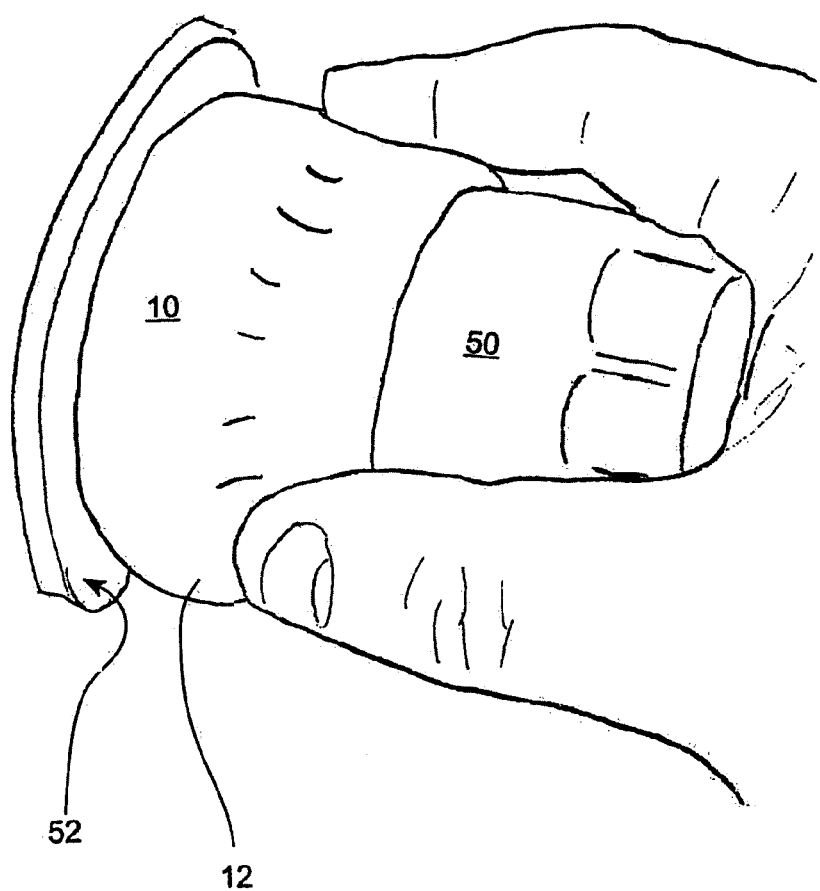
FIG. 3 is an environmental perspective view of the apparatus of FIGS. 1–2, shown surrounding a fluid filter which is mounted on a substrate.

Referring now to FIGS. 1–3 of the drawings, a fluid containment apparatus, in accordance with a first embodiment of the invention, is shown generally at 10. The apparatus 10 is provided for use in changing a spin-on fluid filter 50 (FIG. 3), to minimize spillage therefrom during removal of the filter from an engine block or other substrate 52.

An apparatus 10 according to the first embodiment includes a flexible boot 12, and an absorbent member 30 associated with the boot. The absorbent member 30 may be attached to the boot 12, or alternatively, may be separate from, and nestingly received inside the boot, to fit between the boot and a filter 50.

The Filter Boot

In the embodiment of FIGS. 1–3, the boot apparatus 10 includes a boot 12 with a substantially cylindrical boot body, including a flared bell portion 14, for placement surrounding and spaced away from a filter 50, and a constricted portion 16 for placement closely surrounding a portion of the filter.

The constricted portion 16 is integrally attached to, and coextensive with the bell portion 14. In the depicted embodiment, the constricted portion 16 provides a contact area between the boot and filter 50, so that the boot can grip the filter when the two are rotated together during installation and/or removal. Rotation of the boot along with the filter also rotates the absorbent member 30 inside of the boot, which can provide a wiping effect.

The flared bell portion 14 is adapted to form an annular pocket 18 therein, between the boot 12 and filter 50, when the boot is placed surrounding a cylindrical filter.

The boot may be formed of a vinyl polymer or an oil-tolerant elastomer, preferably with a rough outer surface. Other suitable materials include urethanes and plastisol The Absorbent Member As noted, the apparatus also includes an absorbent member 30 for placement in the flared bell portion 14 of the boot body, for absorbing spillage emanating from the filter base, when the filter 50 is removed from the substrate 52. The absorbent member 30 is provided for placement at least partly disposed inside of the flared bell portion 14 of the boot body. The absorbent member 30 may be generally cylindrical in shape, or may be a flat section of material, which is manually bendable into a cylindrical shape, for placement in the flared bell portion 14 of the boot body.

The absorbent member 30 may be a pad made from a nonwoven fabric material, may include a sponge material, or may be an aggregate material which may include one or more fibers. Preferred materials for the absorbent member 30 include cellulose and melt-blown polypropylene.

The material used to form the absorbent member 30 should be selected for its ability to absorb the target fluid, which may be oil, gasoline, fuel oil, diesel fuel, or similar liquid.

Alternatively, the absorbent member 30 may be a cloth bag, formed in an annular shape, and containing particulate absorbent material, such as clay particles, inside the bag.

Second Embodiment

Figure 4:
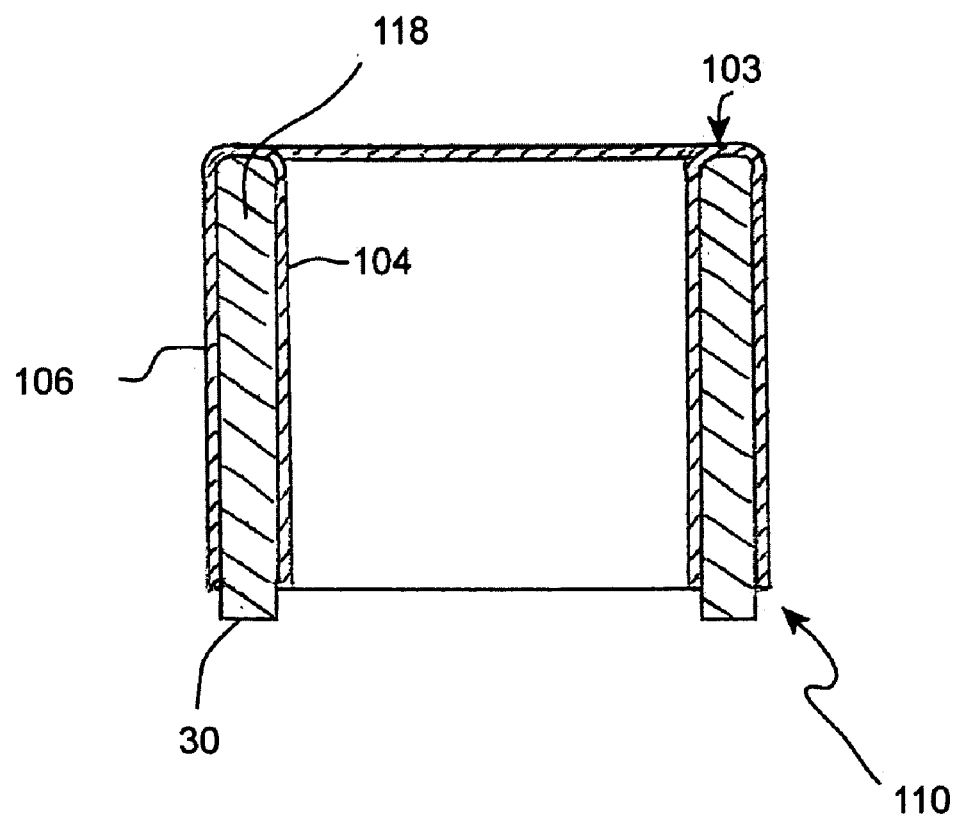
FIG. 4 is a cross-sectional view of a fluid containment apparatus according to a second embodiment of the invention.

A fluid containment apparatus 110 in accordance with a second embodiment of the invention is shown in cross-section in FIG. 4. The fluid containment apparatus 110 of FIG. 4 is similar to the apparatus 10 of FIGS. 1–3, as previously described, except that the boot 103 thereof is modified from the boot 12 of the first embodiment.

In the embodiment of FIG. 4, the boot 103 is preferably formed by dipping a hollow annular cylinder-shaped mandrel into a liquid plastic material, preferably a thermoplastic such as a vinyl polymer to form a layer of liquid plastic on the inner cylindrical surface of the mandrel, the outer cylindrical surface of the mandrel, and one end of the mandrel. The liquid plastic layer is then solidified, e.g. by cooling, and a solid plastic (preferably flexibly resilient) element in the shape of boot 103 is removed from the mandrel. In this dual thickness embodiment, the boot body includes a narrow inner section 104, and a wide outer section 106 integrally connected to, and substantially surrounding the inner section. In the dual thickness embodiment, a hollow pocket 118 is defined between the respective inner and outer sections 104, 106 thereof. The absorbent member 30 is the same as the absorbent member 30 as previously described herein in connection with the fluid containment apparatus 10 according to the first embodiment. The absorbent member 30 fits into the pocket 118. In some preferred embodiments, as shown in FIG. 4, the absorbent member 30 extends beyond the hollow pocket 118. This allows the absorbent member 30 to be compressed against a substrate (not shown) when the filter is mounted on the substrate. In such embodiments, the absorbent member 30 is preferably made of a material that has shape memory so that it can rebound as the filter is removed from the substrate, thereby maintaining contact or at least some degree of proximity between the absorbent material 30 and the substrate so as to more effectively absorb any fluid coming off of the substrate.

Third Embodiment

Figure 5:
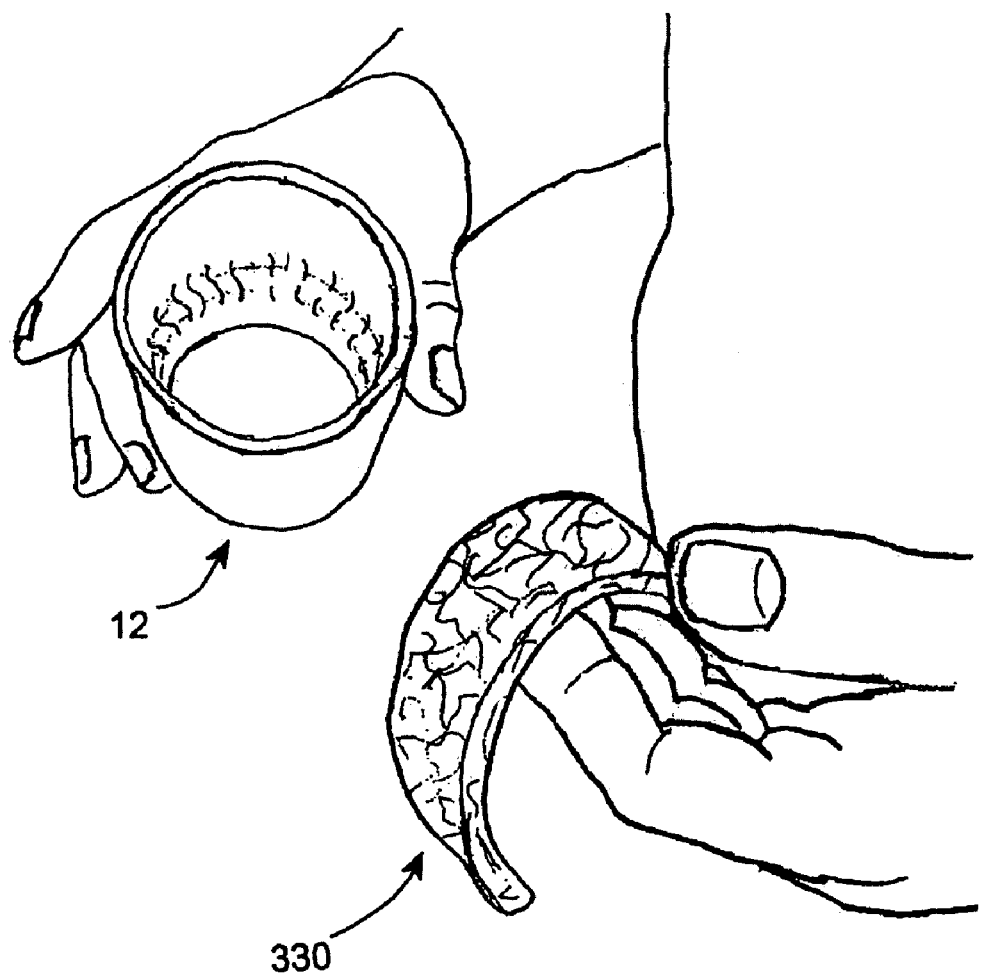
FIG. 5 is a perspective view showing two separate sections of a fluid containment apparatus according to a third embodiment of the invention.
Figure 6:
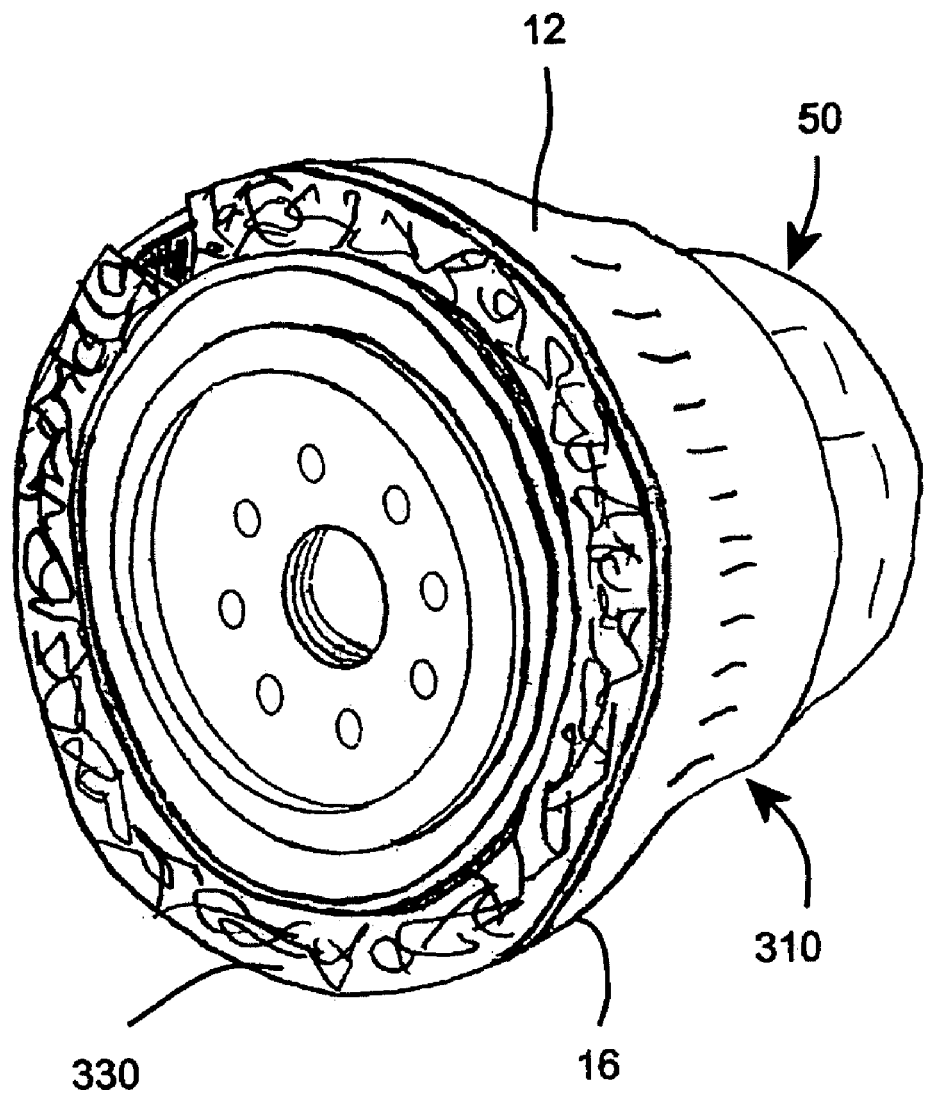
FIG. 6 is a perspective end view of the apparatus of FIG. 5, installed on a filter.

Referring now to FIGS. 5–6, a fluid containment apparatus according to a third embodiment of the invention is shown generally at 310 (FIG. 6). The apparatus 310 according to the third embodiment is substantially similar to the apparatus 10 of the first embodiment as described herein, including a boot 12, which is identical to the boot of the first embodiment. However, in this third embodiment 310, the absorbent member 330 is formed as a flat section of nonwoven material, which is folded into a cylindrical configuration, and placed inside of the bell section 16 of the boot 12.

Fourth Embodiment

Figure 7:
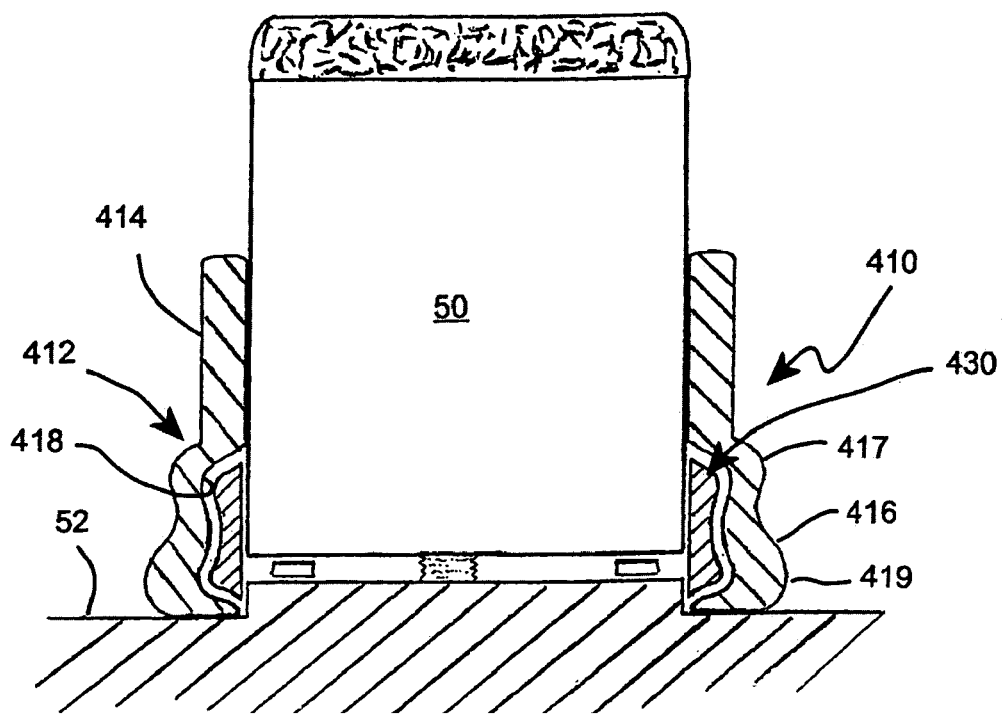
FIG. 7 is a cross-sectional view of a fluid containment apparatus according to a fourth embodiment of the invention, shown mounted on a substrate, and with the fluid passages omitted from the substrate for purposes of illustration.

Referring now to FIG. 7, a fluid containment apparatus according to a fourth embodiment of the invention is shown generally at 410. The apparatus is shown surrounding a filter 50 which is mounted on a substrate 52. The fluid passages inside the substrate have been deleted from the illustration of FIG. 7, since they are not important to a discussion of the apparatus 410. It will be understood, however, that the substrate 52 includes conventional fluid passages therein, in the normal way.

The apparatus 410 according to the fourth embodiment is substantially similar to the apparatus 10 of the first embodiment as described herein, including a boot 412 surrounding an absorbent member 430. The composition of the absorbent member 430 is the same as that described herein in connection with the absorbent member 30 of the first embodiment.

The boot 412 includes a constricted portion 414 for placement closely surrounding a filter 50, and a flared bell portion 416.

The main difference between the fourth embodiment and the first embodiment is that in this fourth embodiment, the flared bell section 416 of the boot 412 includes a plurality of compressible accordion flutes 417, 419 which can be compressed upon installation of the apparatus 410. The flutes 417, 419, where used, allow extended time for a sealing contact between the outermost edge of the boot 412 and the substrate 52, as the filter is removed therefrom.

Further in this fourth embodiment, the absorbent member 430 is configured to fit inside a pocket 418 defined inside the flared bell portion 416 of the boot 412.

Method of Using the Apparatus

The present invention also relates to a method of minimizing fluid spillage during removal of a fluid filter from a substrate.

Referring now to FIGS. 8A–8C and 9, a method according to the present invention includes a step 60 of slidably placing a substantially cylindrical fluid containment apparatus 10 around a cylindrical fluid filter 50, the fluid containment apparatus comprising an absorbent member 30.

Figure 8A:
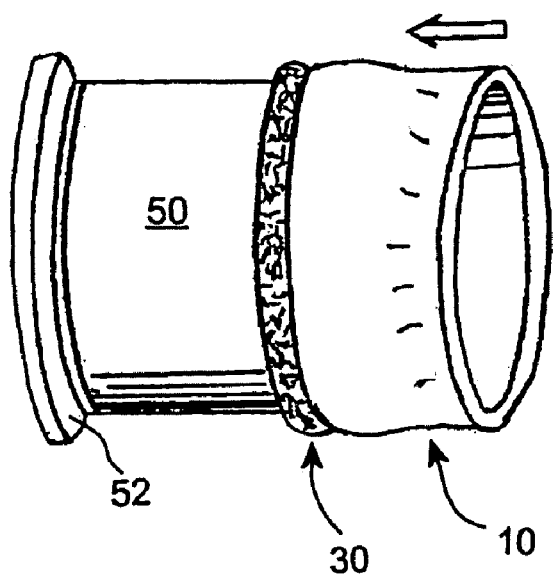
FIGS. 8A–8C show a filter and fluid containment apparatus during a sequence of steps in a method of using the apparatus.
Figure 8B:
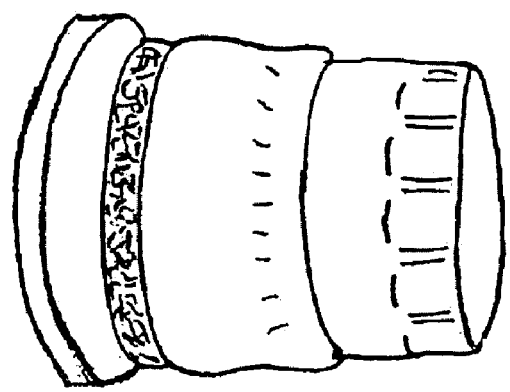
Figure 8C:
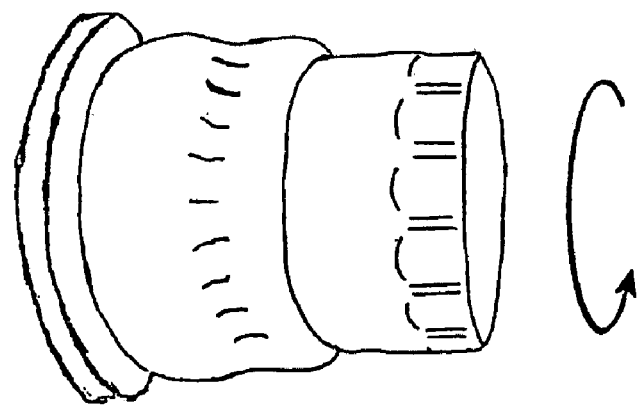
Figure 9:
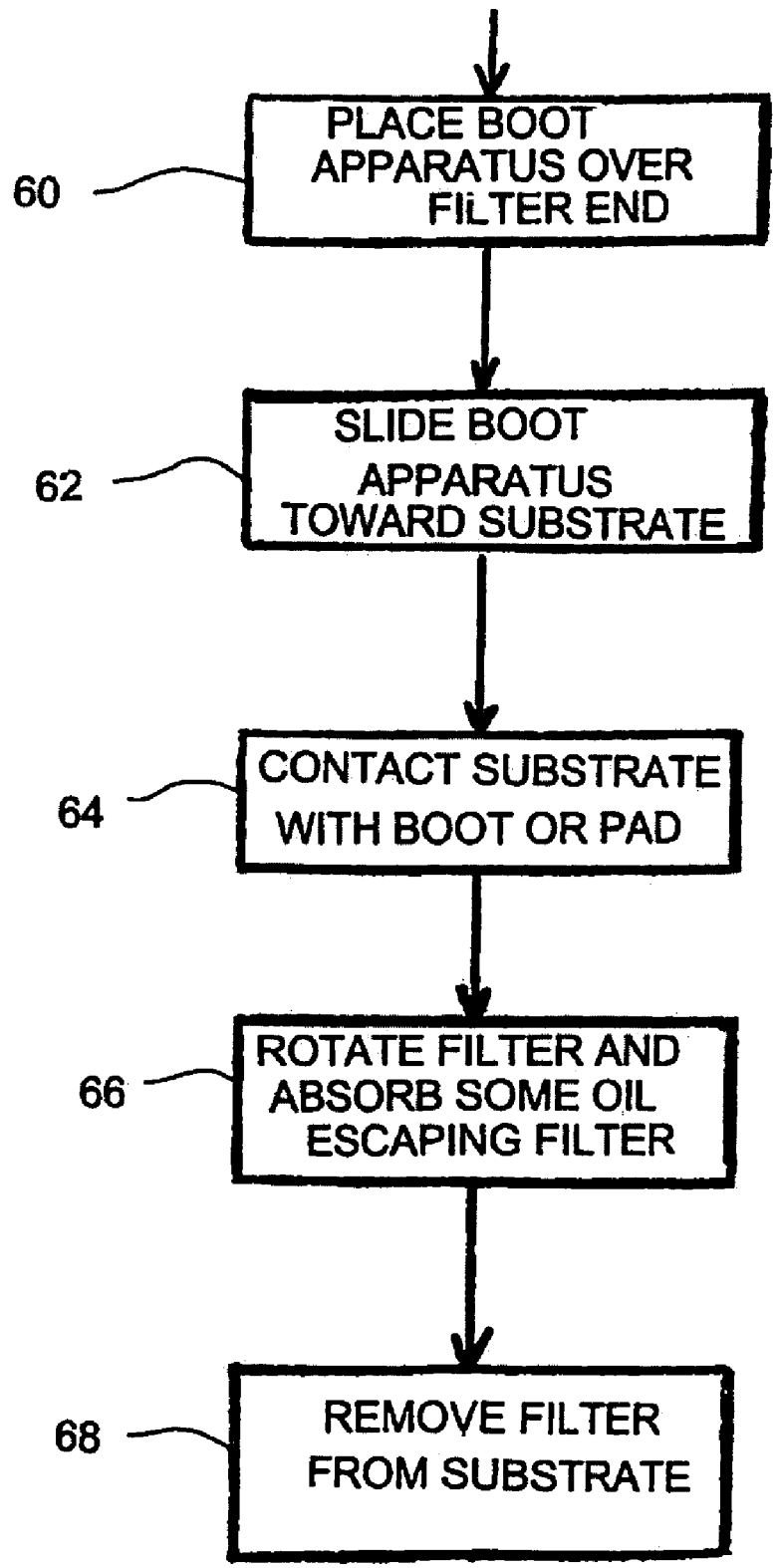
FIG. 9 is a flow chart showing a sequence of steps in practicing a method according to the invention.

In the following step 62, and as shown in FIG. 8B, the fluid containment apparatus 10 is then slid over the filter 50 towards an engine block or other substrate 52 on which the filter is mounted, until part of the fluid containment apparatus 10 contacts the substrate 52 (step 64). The boot 12, the absorbent member 30, or both can contact the substrate.

After the fluid containment apparatus 10 is snug against the substrate 52 (and in some preferred embodiments, preferably sufficiently snug so as to compress an absorbent member 30 having shape memory against the substrate 52), the filter 50 is rotated (step 66) to begin unscrewing it from the substrate. In most applications, the filter 50 is rotated in a counter-clockwise direction for removal, as indicated by the arrow in FIG. 8C. Some fluid spills forth from the filter 50 as spillage proximate the substrate 52 when the filter is removed, and the absorbent member 30 absorbs at least part of that spillage. If it is desired to re-use the fluid containment apparatus 10, the method may also include a step 68 of removing the filter from the substrate. Those in the art will realize that in order to minimize spillage, as soon the filter is removed from the substrate, it is immediately oriented with the openings of the base plate facing upwardly, so that the liquid is retained therein as much as possible.

After removal, the filter is disposed of in approved fashion. The fluid containment apparatus 10 either may be discarded along with the filter, or may be cleaned and re-used by removing and disposing the absorbent member 30 and installing a fresh absorbent member.

Although the present invention has been described herein with respect to a limited number of presently contemplated embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having, thus, described the invention, what is claimed is:

1. A fluid containment apparatus for use during removal of a spin-on fluid filter from a substrate, said apparatus comprising:
   a boot having a substantially cylindrical boot body, said body including:
   a constricted portion configured to grip an outer surface of said filter for rotating said filter to remove said filter from said substrate;
   a flared bell portion depending from said constricted portion, said flared bell portion forming an annular pocket between said outer surface of said filter and an inner surface of said flared bell portion when said constricted portion contacts said outer surface of said filter; and
   an absorbent member disposed in said annular pocket, said absorbent member being positioned to absorb spillage from said filter when said filter is removed from said substrate.

2. The apparatus of claim 1, wherein said absorbent member comprises a pad comprising an absorbent material selected from the group consisting of cellulose and meltblown polypropylene.

3. The apparatus of claim 1, wherein the absorbent member is disposable and further wherein the boot is cleanable and re-usable.

4. The apparatus of claim 1, wherein an ended contact area is provided, inside of the constricted portion of the boot body, for contacting an exterior of a fluid filter, said extended contact area being at least one quarter of the length of said boot body.

5. The apparatus of claim 1, wherein said absorbent member is in the form of a substantially annular disk adapted to fit into said pocket of said boot body.

6. The apparatus of claim 1, wherein said boot body comprises a material selected from the group consisting of vinyl polymers, urethanes, oil-tolerant elastomers, and mixtures thereof.

7. The apparatus of claim 1, wherein said absorbent member is in the form of a substantially flat section of material, which is manually bendable into a cylindrical shape for placement in said pocket of the boot body.

8. The apparatus of claim 1, wherein said fluid filter is an oil filter.

9. The apparatus of claim 1, wherein said flared bell portion comprises a plurality of compressible accordion shaped flutes configured to contact said absorbent member.

10. A method of minimizing fluid spillage during removal of a fluid filter from a substrate, comprising the steps of:

sliding a constricted portion of a fluid containment apparatus along a periphery to the filter toward the substrate on which the filter is mounted until an absorbent member disposed in a hollow pocket of said fluid containment apparatus contacts the substrate;

rotating said constricted portion of said fluid containment apparatus and the filter to begin unscrewing the filter from the substrate, said absorbent member being positioned to absorb a portion of fluid that spills from said filter; and removing the filter from the substrate.

11. The method of claim 10, further comprising wiping at least a portion of said substrate with said absorbent member when said constricted portion of said fluid containment apparatus is rotated.

* * * * *